May 11, 1937.  W. H. MUSSEY ET AL  2,079,747
ARTICULATED CAR
Filed March 26, 1934  3 Sheets-Sheet 1
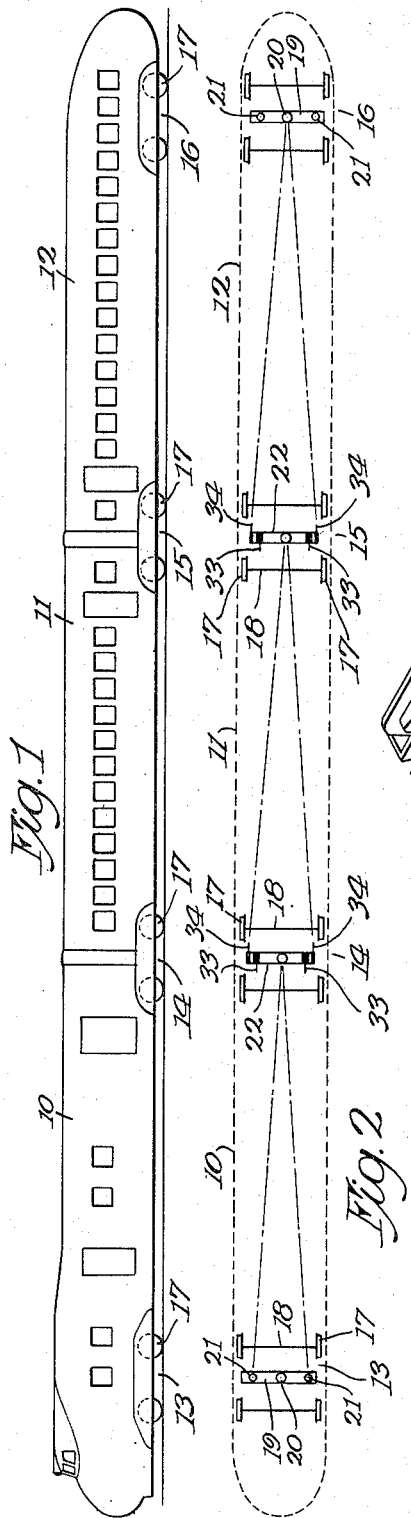
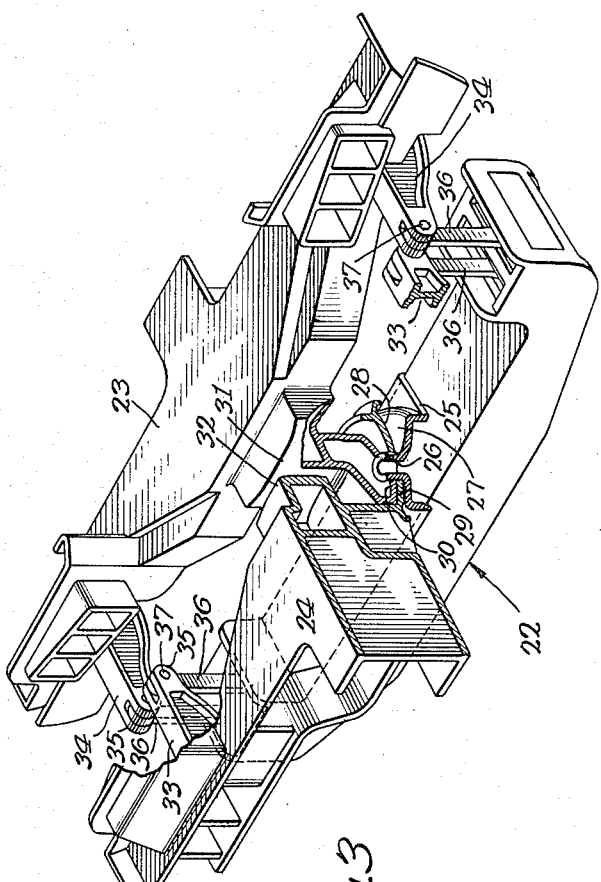
Inventors
William H. Mussey
Martin P. Blomberg
By Gillson, Maun & Cattys.

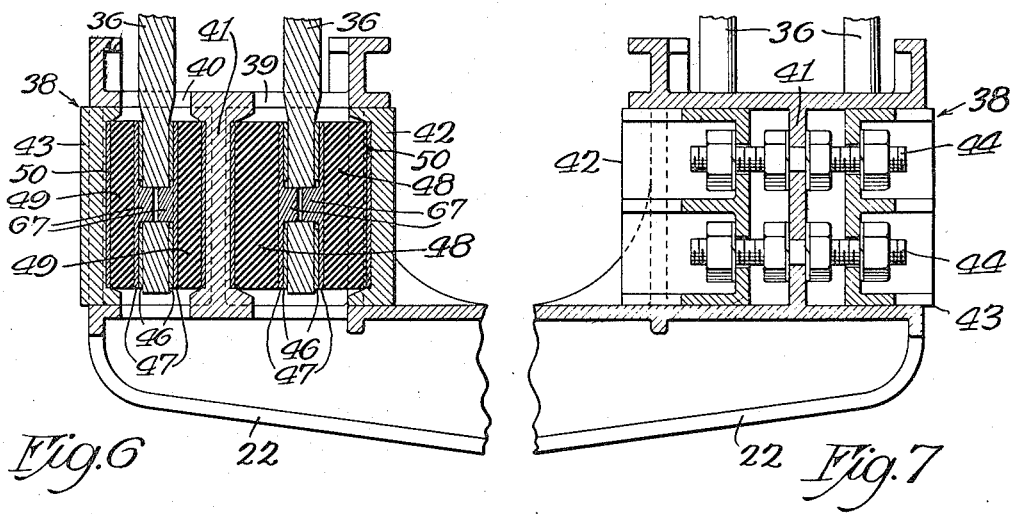
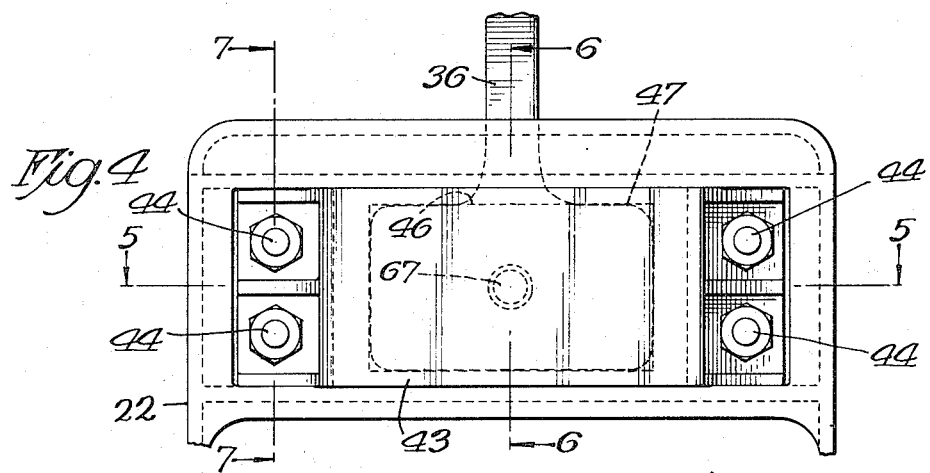
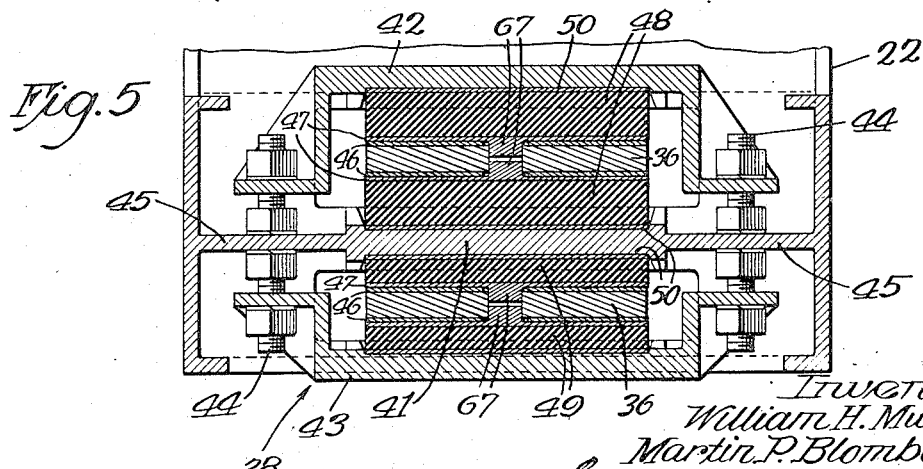

May 11, 1937.  W. H. MUSSEY ET AL  2,079,747
ARTICULATED CAR
Filed March 26, 1934  3 Sheets-Sheet 3

Inventors:
William H. Mussey
Martin P. Blomberg
By Gibson, _____
Attys.

Patented May 11, 1937

2,079,747

UNITED STATES PATENT OFFICE 2,079,747

ARTICULATED CAR

William H. Mussey and Martin P. Blomberg, Chicago, Ill., assignors to Pullman-Standard Car Manufacturing Company, Chicago, Ill., a corporation of Delaware Application March 26, 1934, Serial No. 717,419

17 Claims. (Cl. 105—4)

This invention relates to what is known as articulated cars which comprise two or more sections having car bodies with adjacent ends articulated and carried by a common truck. Car Builders Cyclopedia, 1931, pages 568 and 569. And the principal object of the invention is to replace the side bearings (C. B. C., pp. 75, 817 to 823) at the common articulating trucks with linkage that will make for better articulation.

In the drawings—

Fig. 1 is a diagrammatic side elevation of a three-section, or three bodied car;

Fig. 2 is a diagrammatic plan of the same car;

Fig. 3 is a perspective view of two end sills, a truck bolster, center bearings, and the preferred form of linkage;

Fig. 4 is an elevation of the connection between the linkage and the truck bolster looking at the end of the bolster;

Fig. 5 is a horizontal section taken on the line 5—5 of Fig. 4;

Figure 8:
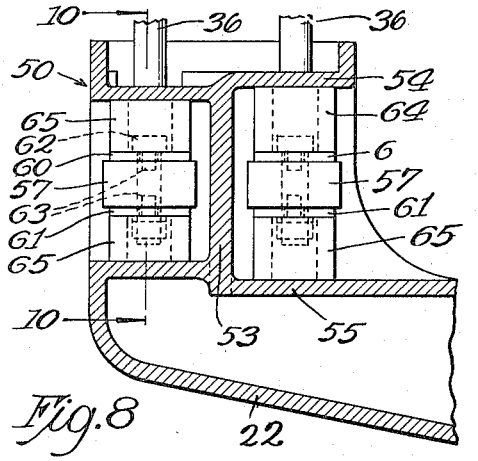
Figure 9:
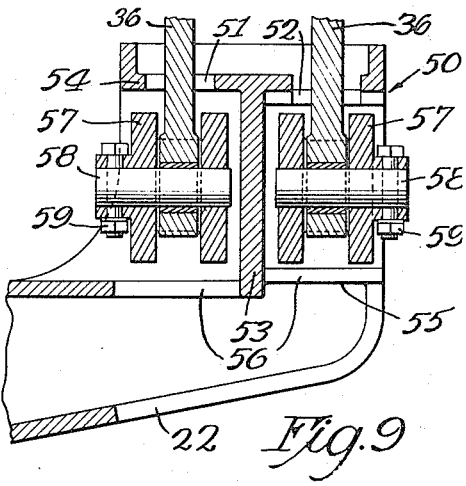
Figure 10:
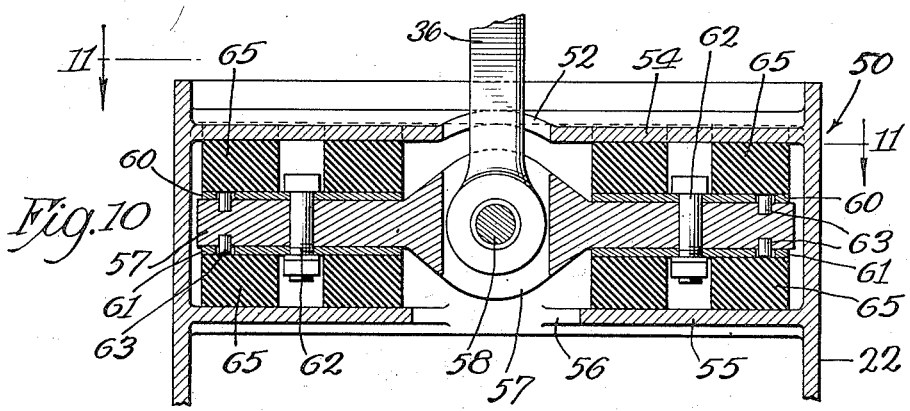

Figs. 6 and 7 are vertical sections taken on the lines 6—6 and 7—7 of Fig. 4;

Figs. 8 and 9 are sections similar to Figs. 6 and 7, showing an alternative form of connection;

Fig. 10 is a vertical section on the line 10—10 of Fig. 8; and

Figure 11:
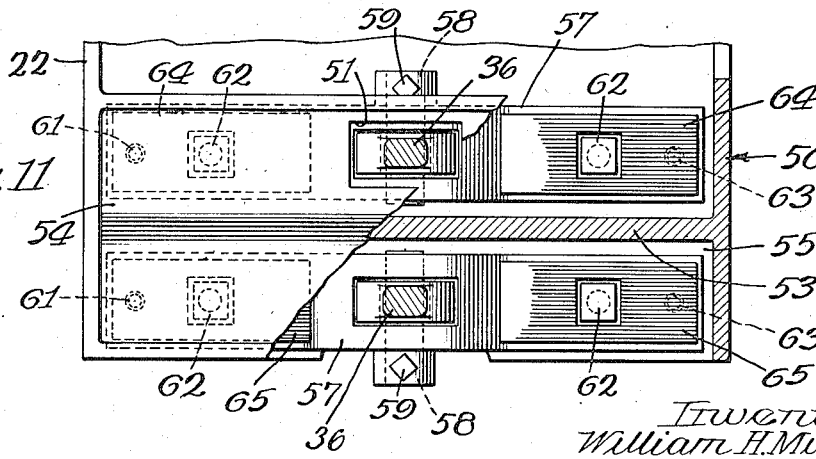

Fig. 11 is part plan and part horizontal section taken on the line 11—11 of Fig. 10.

In Figs. 1 and 2, the car sections, or bodies 10, 11 and 12 are shown carried by four trucks 13, 14, 15 and 16.

The type of truck is so much a matter of selection that diagrammatic wheels 17, axles 18, and bolsters 19 will be sufficient illustrations with reference to Car Builders' Cyclopedia, 1931, Section 10, page 763, for a selection. As a rule, however, "swing motion trucks" (C. B. C., 1931, p. 83) will be found preferable.

The motor and trailer trucks (the front and rear trucks, respectively) have conventional center gearings 20 and side bearings 21 (C. B. C., 1931, Sec. 10) but the side bearings on the trailer truck are preferably resiliently yieldable as compared with relatively rigid side bearings on the motor truck (C. B. C., 1931, pp. 815–823).

Turning now to Fig. 3, (Sheet 1) 22 is the spring mounted bolster of one of the articulated trucks 14 and 15, and 23 and 24 are the respective end sills of the adjacent car bodies or sections.

The bolster 22 carries a truck center plate 25 having a pintle 26 surrounded by a spherical bearing surface 27, which receives a corresponding surface 28 on the lower side of the body center plate 29 supporting the end sill 24 and perforated to fit the pintle 26.

The body center bearing 29 has its upper surface spherical to cooperate with the corresponding surface on the body center plate 30, carrying the center sill 23 and also perforated to fit over the pintle 26.

There is clearance between the heads 31 and 32 on the center sills from which, and the construction of the center bearing described, it will be obvious that the car bodies and the truck bolster may have appropriate articular movement in passing around or over curves in the track. But other forms of center bearings may be used in applying this invention.

Instead of using side bearings between the bolster 22 of the articulated trucks and the adjacent car bodies, they are tied together by a flexible and resilient linkage. In the form chosen here for illustration, the end sill 24 is provided at each side of the center bearing with an arm 33 and the end sill 23 is provided with arms 34 at somewhat greater distance from the center bearing. The arms 33 and 34 are built like cantilever beams, and each is forked at its outer end 35 to receive the upper end of an eye bar 36 and drilled to receive a pivot pin 37 by which the eye bar and arm are pivotally connected.

The lower ends of the eye bars 36 are pivotally and also resiliently connected with the bolster, and two ways of accomplishing this are shown: One on Sheet 2, and the other on Sheet 3.

According to Sheet 2, Figs. 4 to 7, each end of the bolster 22 is equipped with what may be called a clamping box 38, slotted at 39 and 40 to admit an eye bar 36 at each side of a fixed partition 41, the sides 42 and 43, opposite the partition being adjustable by bolts 44, fixed in the end portions 45 of the partition 41, as best shown in Figs. 5 and 7. The slots 39 and 40 are slightly wider than the thickness of the eye-bars 36 in order to permit a slight turning of the bars when the vehicle travels around a curve. The resilience of the rubber blocks will permit sufficient angular movement of the eye-bars 36 to accommodate the turning movement of one car section relative to the other when the articulated car is traveling around the curves.

Turning now to Figs. 5 and 6, it will be seen that the lower end of each eye-bar 36 lies between two steel washers 46 which, in turn, lie between steel plates 47, vulcanized to rubber blocks 48 and 49 beyond which are other steel plates 50, also vulcanized to the corresponding rubber blocks.

The plates 47 have central lugs 67 projecting through the washers 46 and two together forming a pintle, about which the lower end of the corresponding eye bar 36 may swing or rotate between the washers 46.

By adjusting the clamping bolts 44, the rubber block may be compressed between the side plates 42 and 43 and the partition 41, and thus put in condition to endure the shearing action that will result from the tendency of the eyebars to move in a substantially vertical plane as the car travels around or over curves in the track.

From Figures 2, 3, 5 and 6, it will be seen that the arms 33 which are near the center plate, are connected with the eye-bars 36, whose lower ends are pivoted between the thicker rubber blocks 48, whereas the arms 34, more remote from the center bearing, are connected through the eye-bars 36 with the thinner rubber blocks 49.

It will be obvious that for a given relative rotation about the center line of two adjacent car bodies, the arms 33 would have less movement with respect to the original position than the arms 34, which are more remote from the center line. It will also be obvious that since the arms 33 coact with the larger rubber blocks 48, they will meet with less resistance for a corresponding pressure in the clamping box.

Now turn to Fig. 2, and assume that the side bearings 21 on the leading car 10 are rigid, or only slightly resilient, and the side bearings 21 on the rear or trailer car 12 are quite resilient (C. B. C., 1931, pages 815-823) and assume also that the train is moving onto an elevated curve to the left.

As soon as the truck 13 takes the curve, the elevated outer rail of the track will act through the more or less rigid side bearings 21 and cause the front end of the leading car section to tilt a corresponding amount (substantially) to the left. This torsional stress is carried rearwardly through the car body and would be transformed into torsional strain through the reaction at the rear end of the section if it were not for the resilient linkage at the bolster 22 of the articulated truck.

As it is, the stress is transmitted through relatively small lever arms (small as compared with the larger lever arms through which torsional stresses are transmitted between the bolster and the forward end of the following car section) to the large rubber blocks 48 (which are more resilient than the thinner blocks 49) carried at the ends of the bolster, and the bolster in turn transmits the residual stress through relatively stiff rubber blocks and relatively long lever arms to the forward end of the following car section. At the rear of the second car section, there is a similar transmission of stress to the trailer section with a certain absorption of the stress by the strain imposed upon the rubber blocks associated with the linkage. The final reaction is at the trailer truck 16 where the yieldable and resilient side bearings 21 absorb as much of the remaining stress as possible.

In effect, then, every torsional stress to which the car is subjected is distributed throughout the car sections with rubber blocks absorbing the greater part of the stress energy. The resultant saving in body strain permits the car to be built lighter, and at smaller cost.

As each car section body has relatively rigid stabilizers at the front (non-yieldable side bearings on the leading truck and thin rubber blocks associated with the outer arms 34 on the articulated trucks) and relatively resilient stabilizers at the rear (the thick rubber blocks on the articulated trucks associated with the arms 33 and the yieldable side bearings 21 on the trailer truck), it may be said that the car bodies have three-point suspension, as indicated by the dotted lines in Fig. 2, with the center bearings of the articulated trucks and the trailer truck constituting the apices of the triangle.

Although the above explanation is believed to be a correct analysis of the distribution of stresses under the conditions given, it will be understood that the arrangement and construction of the stabilizing linkages may be widely varied. For example, in some cases, it may be desirable to employ fairly resilient side bearings on the leading truck 13 in order to ease the torque which is transmitted to the car as it begins to take a curve. In some cases also, it may be desirable to have the side bearings on the trailer truck 16 relatively rigid in order to give greater stability to the rear end of a car. The invention, therefore, is not limited in any way to the arrangement shown and the claims are to be construed accordingly.

It is also within the scope of this invention to reverse the three-point suspension in any one or more of the car bodies, i. e. have the apex of the triangle or triangles to the front. Certain advantages would be gained by various combinations of the triangles (which represent the three-point suspension) other than the one shown in the drawings.

Sheet 3 of the drawings (Figs. 8–11 inclusive) shows another form of linkage, consisting of a box 50 slotted at 51, 52 to admit an eyebar 63 on each side of a fixed partition 53, and the sides opposite to the partition are in this instance left open from the top 54 to the bottom 55 which is in two parts, leaving a gap 56 at the middle.

Each eye-bar 63 has its lower end pivoted in the middle of an equalizer bar 57 by a pin 58 made fast by a bolt 59. Steel plates 60 and 61 above and below each end of each equalizer bar 57 are made fast by bolts 62 and pins 63, and are vulcanized to rubber blocks 64 and 65 fitted tightly against the top 54 and bottom 55. The blocks 64 nearer the center are larger and allow more yield than the blocks 65 nearer the end of the bolster.

In both forms of the linkage it will be obvious that there is a minimum of friction, because instead of the sliding and usually grinding action of the side bearings, there is a smooth pivotal movement cushioned and distributed so as to make for general ease in putting the car, as a whole, through the necessary movements on a curve. The linkage also acts as a sway stabilizer on straight track, for every tendency of the car to tilt one way or the other is resiliently resisted at both ends of the truck bolster.

The resilient element of the linkage which connects each car body with opposite ends of the truck bolster may be located on the car body instead of on the truck bolster, or it may be a part of the linkage itself.

In the form of the invention shown in Figs. 4–7 inclusive, the rubber pads 48 may be 8¾" x 5" x 1⅜", 60 Duro, and the pads 49 may be 8¾" x 5" x ⅞", 68 Duro. These dimensions and durometer ratings assume a weight of approximately 200,000 lbs. for the three section car.

We claim:

1. In a car, a front truck, a car frame, center and side bearings supporting the front end of the car frame on the front truck, a rear truck, a truck bolster on the rear truck, center bearings supporting the rear end of the car frame on the truck bolster yielding means to tie each end portion of the truck bolster to the corresponding side of the car frame at the rear, another car frame having its forward end supported on said rear truck, and means for supporting the rear end of said last named car.

2. In a car, a front truck, a car frame, center and side bearings supporting the front end of the car frame on the front truck, a rear truck, a truck bolster on the rear truck, center bearings supporting the rear end of the car frame on the truck bolster yielding means including a link for tying each side of the car frame at the rear to the corresponding end portion of the truck bolster, another car frame having its forward end supported on said rear truck, and means for supporting the rear end of said last named car.

3. In a device of the class described, a truck having a bolster, a car frame having a center bearing supported on the bolster, a resilient means at each side of the car for tying the car frame with the corresponding end portions of the bolster, each of said means resisting both up and down movement.

4. In a device of the class described, a truck having a bolster, a car frame having a center bearing supported on the bolster, resilient means tying the car frame at each side with the corresponding end portions of the bolster, another car frame having a center bearing supported on the bolster and resilient means more yielding than the first mentioned tying the last mentioned car frame at each side with the corresponding end portions of the bolster.

5. In a device of the class described, a truck having a bolster, a car frame having a center bearing supported on the bolster, resilient means tying the car frame at each side with the corresponding end portions of the bolster, another car frame having a center bearing supported on the bolster and resilient means more yielding than the first mentioned tying the last mentioned car frame at each side with the corresponding end portions of the bolster nearer to the center bearing than said first named resilient means.

6. In a device of the class described, a truck having a bolster, a car frame having the center bearing supported on the bolster, a link pivoted to the frame at each side of the center bearing, and resilient means for connecting said links with the corresponding end portions of the bolster, said means resiliently resisting both the up and down movements of each side of said car frame relative to the truck.

7. In a device of the class described, a truck having a bolster, a car frame having the center bearing supported on the bolster, a link pivoted to the frame at each side of the center bearing, and means for connecting each link with the corresponding end portion of the bolster comprising metal plates pivoted to the link, rubber blocks attached to the plates and a clamp for the blocks.

8. In a device of the class described, a truck having a bolster, a car frame having a center bearing supported on the bolster, a link pivoted to the frame at each side of the center bearing, a box on the bolster receiving each link, and resilient means in the box making the link fast and permitting each link to move relative to the box, said links passing through slots in said box.

9. In a device of the class described, a truck having a bolster, a car frame having a center bearing supported on the bolster, a link pivoted to the frame at each side of the center bearing, a box on the bolster receiving each link, an equalizer in the box pivoted to the link, and rubber blocks resisting movement of the equalizer.

10. In an articulated car having a plurality of body sections, a leading truck, a trailer truck, and an articulated truck between each two adjacent body sections for supporting said articulated car, relatively rigid side bearings on the leading truck, relatively resilient side bearings on the trailer truck, for engaging the corresponding body section for resisting a tilting of the same, and yieldable linkage between the articulated truck and adjacent body sections for resisting the lateral tilting of said sections.

11. In an articulated car having a plurality of body sections, a leading truck, a trailer truck, and an articulated truck between each two adjacent body sections for supporting said articulated car, relatively rigid side bearings on the leading truck, relatively resilient side bearings on the trailer truck, for engaging the corresponding body section for resisting a tilting of the same, and yieldable linkage between the articulated truck and adjacent body sections for resisting overturning of said sections while traveling around the curves, the linkage at the rear of the leading section at each articulated joint being less resistant to yielding than the linkage at the front of the following section.

12. In an articulated car having a plurality of body sections supported by leading, trailer and articulated trucks, the latter being between adjacent car sections and including a truck bolster, relatively rigid stabilizers associated with the truck and body at the forward end of the car, and relatively yieldable stabilizers associated with the truck and body at the rearward end of the car, the stabilizers at the articulated truck or trucks coacting with the articulated truck bolster and adjacent body sections whereby torsional stress is transmitted from one car section to another.

13. In an articulated car of the type in which the adjacent ends of two car bodies are swiveled on a common truck having a truck bolster, the combination therewith of rear and front stabilizers on the leading and trailing car bodies respectively, all of said stabilizers reacting on the truck bolster and the latter stabilizers being more rigid than the former.

14. In an articulated car of the type in which the adjacent ends of two car bodies are swiveled on a common truck having a bolster, the combination therewith of rear and front stabilizers on the leading and trailing car bodies, respectively, all of said stabilizers reacting on the truck bolster and the latter stabilizers having substantially different resiliency than the former.

15. In an articulated car having a plurality of body sections, two of which are connected by an articulated truck having a bolster, stabilizers on opposite sides of each of said two sections reacting on the bolster, the resiliency of the stabilizers associated with one section being substantially different than the resiliency of the stabilizers associated with the other section.

16. In an articulated car comprising a leading section, an intermediate section, and a trailer section, articulated trucks including center bearings joining the adjacent ends of said sections, said intermediate section being supported on the central bearings of the adjacent trucks and means for providing lateral support for said intermediate section on said adjacent trucks, said means being arranged so as to provide a resilient resistance to side tilt at one end of said intermediate section and substantially less resistance to side tilt at the other end of said intermediate section.

17. In an articulated car comprising a leading section, an intermediate section, and a trailer section, articulated trucks joining the adjacent ends of said sections, and lateral support stabilizers on the intermediate section for maintaining the body in upright position on the two articulated trucks which support it, said stabilizers being arranged so that at one end of the section, the lateral support is relatively rigid, and at the other end, the lateral support is relatively resilient.

MARTIN P. BLOMBERG.
                WILLIAM H. MUSSEY.